(12) United States Patent
Meyer et al.

(10) Patent No.: US 7,480,387 B2
(45) Date of Patent: Jan. 20, 2009

(54) IN THE EAR HEARING AID UTILIZING ANNULAR ACOUSTIC SEALS

(76) Inventors: John A. Meyer, 353 Oakridge Dr., Rochester, NY (US) 14617; Dean Thomas Penman, 4935 Spaulding Dr., Clarence, NY (US) 14031

( * ) Notice: Subject to any disclaimer, the term of this patent is extended or adjusted under 35 U.S.C. 154(b) by 266 days.

(21) Appl. No.: 11/502,053

(22) Filed: Aug. 10, 2006

(65) Prior Publication Data

US 2007/0009129 A1    Jan. 11, 2007

Related U.S. Application Data

(63) Continuation-in-part of application No. 10/992,040, filed on Nov. 18, 2004, now Pat. No. 7,164,775.

(60) Provisional application No. 60/525,911, filed on Dec. 1, 2003.

(51) Int. Cl.
*H04R 25/02* (2006.01)
(52) U.S. Cl. .................. 381/322; 381/324; 381/328
(58) Field of Classification Search ................ 381/322, 381/324, 328; 181/129, 130, 134, 135
See application file for complete search history.

(56) References Cited

U.S. PATENT DOCUMENTS

| | | |
|---|---|---|
| 4,061,972 A | 12/1977 | Burgess |
| 4,947,432 A | 8/1990 | Topholm |
| 5,002,151 A | 3/1991 | Oliveira et al. |
| 5,048,090 A | 9/1991 | Geers |
| 5,202,927 A | 4/1993 | Topholm |
| 5,338,287 A | 8/1994 | Miller et al. |
| 5,447,489 A | 9/1995 | Issalene et al. |
| 5,835,610 A | 11/1998 | Ishige et al. |
| 6,167,141 A * | 12/2000 | Yoest .......................... 381/322 |
| 6,228,020 B1 | 5/2001 | Juneau et al. |
| 6,229,900 B1 | 5/2001 | Leenen |
| 6,310,961 B1 * | 10/2001 | Oliveira et al. .............. 381/328 |
| 6,367,578 B1 * | 4/2002 | Shoemaker .................. 181/135 |
| 6,432,247 B1 | 8/2002 | Juneau et al. |
| 6,434,248 B1 | 8/2002 | Juneau et al. |
| 6,438,244 B1 | 8/2002 | Juneau et al. |
| 6,473,512 B1 | 10/2002 | Juneau et al. |
| 6,766,878 B2 | 7/2004 | Widmer et al. |
| 6,920,414 B2 | 7/2005 | Topholm |
| 7,010,137 B1 | 3/2006 | Leedom et al. |
| 7,164,775 B2 | 1/2007 | Meyer et al. |

OTHER PUBLICATIONS

International Search Report and Written Opinion of the International Searching Authority, Jul. 26, 2006 (9 pages).

* cited by examiner

*Primary Examiner*—Brian Ensey
(74) *Attorney, Agent, or Firm*—Howard J Greenwald

(57) ABSTRACT

Disclosed is a hearing aid assembly wherein the hearing aid is comprised of an acoustic receiver, an acoustic transmitter, and a body, and an annular channel, wherein the acoustic receiver is designed to fit into a external acoustic meatus of an ear, the acoustic transmitter is designed to fit into a inner ear canal, and the generally cylindrical body is disposed between the receiver and the transmitter, the annular channel is disposed on the surface of the body such that it circumscribes the body's circumference. The annular channel is adapted to receive an annular ring which functions as an acoustic seal and which, in one preferred embodiment, has a T-shaped cross-section.

6 Claims, 8 Drawing Sheets

IN THE EAR HEARING AID UTILIZING ANNULAR ACOUSTIC SEALS

CROSS-REFERENCE TO RELATED PATENT APPLICATIONS

This application is a continuation-in-part of applicants' patent application Ser. No. 10/992,040, filed on Nov. 18, 2004 now U.S. Pat. No. 7,164,775, which claims the benefit of U.S. Ser. No. 60/525,911, filed on Dec. 1, 2003. The entire content of each of the aforementioned applications is hereby incorporated by reference into this specification.

FIELD OF THE INVENTION

A hearing aid assembly with a housing whose outer surface contains one or more annular channels within which are disposed a compliant acoustic material ring seal that preferably has a cross-sectional shape similar to that of T.

BACKGROUND OF THE INVENTION

Hearing aid assemblies are well known to those skilled in the art. By way of illustration and not limitation, reference may be had to U.S. Pat. No. 6,228,020 (compliant hearing aid), U.S. Pat. No. 6,438,244 (hearing aid construction with electronic components encapsulated in soft polymeric body), U.S. Pat. No. 6,473,512 (apparatus and method for a custom, soft-solid hearing aid), U.S. Pat. No. 6,434,248 (soft hearing aid molding apparatus), U.S. Pat. No. 6,432,247 (method of manufacturing a soft hearing aid), the references cited during the prosecution of the aforementioned United States patents, and the like. The entire disclosure of each of these United States patents, and of each of the references cited during their prosecution, is hereby incorporated by reference into this specification. Some of the teachings of these "prior art" patents are discussed below.

Major strides have been made in the hearing aid industry in the programmable digital signal processing systems. Hearing care professionals expected these advancements to solve the problematic issues of traditional sound amplification and thus advance the market forward. Unfortunately, these expectations have not been fully realized. These developments have solved many of the problems associated with traditional electronic design.

Historically, custom molded ear worn hearing instruments have been limited to an "acrylic pour" process as the means of construction. The development of computer chip microminiaturization and the development of computer chip programming, the ear worn instruments have become smaller.

Developments outside the hearing aid industry have resulted in a more advanced level of microminiaturization of electronic components for industrial applications. Thus, advanced signal processing can be housed in less volume than was necessary for the traditional electroacoustic components.

With the development of programmable hearing aids, using either analog or digital signal processing, custom electronic design has shifted from the manufacturing level to the clinical level. The hearing care professionals can now customize the acoustic system response using software control.

Advances have also been made in the custom prosthetic design and manufacture. In the late 1960's custom in the ear hearing aids were developed. The materials and techniques were adopted from the dental industry. The housing or shell is constructed with an acrylic ester copolymer that is hard. The shell housing hardness indexes or resistance to deformation is in the range of 90 Shore D scale. This is very hard. By comparison, a bowling ball has a hardness of about 90 Shore D scale. This process provides a structure that possesses the required strength and stiffness necessary to protect the sensitive electronic components mounted within the shell. Acrylic shells of in the canal hearing aids are positioned near the bony portion of the ear canal.

Digital production of customized hearing aids today replaces the labor intensive process with one that is fully computer driven. The hearing aids produced with this system typically offer a significantly better fit and therefore better performance than hearing aids produced using the techniques adopted from the dental industry.

The ear impression scanner is the point of entry of the digital hearing aid production system. The patient's ear impression is scanned using an optical scanning system. Laser planes are projected onto the ear impression. High-resolution cameras acquire images of the lines thus created on the ear impression. Image processing software tracks the images of the lines thus created on the ear impression.

The initial output of the scanning process is a point surface of approximately 200,000 points that is dependant on the impression. Surface creation software then optimizes this data and creates a polygonal model. The final surface is reduced to approximately 25,000 triangles. This results in an accurate replica of the full original impression in a compressed format, which makes it easy to manipulate, store and transfer.

Software creates a user defined shell thickness and optimally positions the electronic module, transducers and any controls. The ventilation and sound exit are then created. A milling path for the faceplate ensures a correct fit with the shell's geometry. Once the shell has been completed, it can be visualized inside the original impression to assess the fit with the user's ear. Deviations between the original impression and the finished shell can be displayed. The completed shell date is then imported to the 3D printing equipment. The printers use stereo lithography that uses a laser to solidify thin layers of a hypoallergenic UV cured acrylic liquid polymer. The shell is manufactured by the 3D printer.

The bony portion of the canal is extremely sensitive and intolerant of shells that are over sized or is in contact with the canal wall beyond the second anatomical bend. The rigid shell that does not compress pivots in reaction to jaw or head movement. This changes the direction of the receiver and transmitter yielding distorted acoustic response. In addition, the pivot action causes displacement of the device resulting in unwanted acoustic feedback. This problem has caused many shell modifications, thereby compromising the precision approach design process. Many such devices require some modification by the manufacturer. Most manufacturers can expect a high percentage of returns for modifications or repair within the first year. Thus, completely in the canal shell design has been reduced to more of a craft than science.

The current trend for custom hearing aid placement is to position the instrument toward the bony portion of the ear canal. The ear canal can be defined as the area extending from the concha to the tympanic membrane. It is important to note that the structure of this canal consists of elastic cartilage laterally, and porous bone medially. The cartilaginous portion constitutes the outer one third of the ear canal. The medial two-thirds of the ear canal is osseous or bony. The skin on the osseous canal, measuring only about 0.2 mm in thickness, is much thinner than that of the cartilaginous canal, which is 0.5 mm in thickness. The difference in thickness directly corresponds to the presence of apocrine (ceruminous) and sebaceous glands found only in the fibro-cartilaginous area of the canal. Thus, this thin-skinned thinly lined area of the bony canal is extremely sensitive to any hard foreign body, such as a hard shell hearing instrument.

Exacerbating the issue of placement of a hard foreign body into the osseous area of the canal is the ear canal's dynamic nature. It is geometrically altered by temporomandibular joint action and changes in head position. This causes an elliptical type of elongation (widening) of the ear canal. These alterations in canal shape vary widely from person to person. Canal motion makes it very difficult to achieve a comfortable, true acoustic seal with hard shell material. When the instrument is displaced by mandibular motion, a leakage or slit leak creates an open loop between the receiver and the microphone and relates directly to an electroacoustic distortion commonly known as feed back. Peripheral acoustic leakage is a complex resonator made up of many transient resonant cavities. These cavities are transient because they change with jaw motion as a function of time, resulting in impedance changes in the ear canal.

These transients compromise the electroacoustic performance of the hearing aid. The properties of the hard shells have limitations that require modification to the shell exterior to accommodate anatomical variants and the dynamic nature of the ear canal. The shell must be buffed and polished until comfort is acceptable. The peripheral acoustic leakage caused by these modifications results in acoustic feedback before sufficient amplification is attained.

Hollow shells used in today's hearing aid designs create internal or mechanical feedback pathways unique to each device. The resulting feedback requires electronic modifications to "tweak" the product to a compromised performance. With the industry's efforts to facilitate the fine tuning of the hearing instruments for desired acoustic performance, programmable devices were developed. The intent was to reduce the degree of compromise, but by their improved frequency spectrum the incidence of feedback was heightened. As a result, the industry still falls well short of audiological optimum.

A few manufacturers have attempted all soft, hollow shells as alternatives to the hard hollow shells. Unfortunately, soft vinyl materials shrink, discolor, and harden after a relatively short period of wear. Polyurethane has proven to provide a better acoustic seal than polyvinyl, but has an even shorter wear life. Silicones have long wear life but are difficult to bond with plastics such as acrylic, a necessary process for the construction of the custom hearing instruments. To date, acrylic has proven to be the only material with long term structural integrity. The fact remains, that the entire ear is a dynamic acoustic environment and is ill-served by a rigid material.

There are manufacturers constructing solid soft hearing instruments. The material is very soft, comprising an elastomer of about 3 to 55 durometer Shore A, and preferable 10 to 35 Shore A. The material can be a silicone polymer and it actually encapsulates the electronic components. This compliant type of hearing aid body solves many of the problems noted with the hard shell bodies. Unfortunately, fundamental electronic mounting problems result. The basic issue is the constant flexing of all of the very fine diameter interconnection wires from the micro miniature chip to the receiver, transmitter and face plate. The potential consequences are wire breakage and micro chip bond failure. The main cause of this constant flexing is the ear canal's dynamic nature. It is geometrically altered by temporomandibular joint action and changes in hear position. The electronic components are encapsulated and thus are forced to move with the soft body of the hearing aid. The result is a loss of reliability of the complex computer controlled system. The interconnection system must not be constantly flexed. The problem is further complicated by the necessary flexing whenever the instrument is inserted or removed from the patient's ear. The reliability of the bond between the soft silicone polymer and face plate is also questionable. The net result is a complex system that solves many of the problems associated with hard shell instruments but suffers from reliable system operation.

It is an object of this invention to provide a hearing aid assembly that is superior to the prior art hearing aid assemblies. By way of illustration and not limitation, some of the more particular objects of the invention are described below.

It is an object of this invention to provide an assembly that improves the performance and reliability of the hard shell acrylic ester copolymer hearing aid instruments or similar material and the solid soft hearing instruments. This is provided by incorporation of many of the unique advantages of both the hard shell and solid soft shell hearing aid instruments.

It is an object of this invention to provide a hearing aid assembly with one or more of the improved functions described below.

In one embodiment, a hypoallergenic UV cured acrylic shell hearing aid body (or similar material) is used, but the hearing aid body geometry for the right and left ear is modified by computer modeling to remove any portion of the shell that would interfere with the ear canal that is geometrically altered by the patients' temporomandibular joint action and changes in head position In another embodiment, a hypoallergenic UV cured acrylic shell hearing aid body (or similar material) is used, but the hearing aid body geometry for the right and left ear is modified by computer modeling to add two acoustic seal ring channels. The first channel is positioned near the receiver and face plate and the second near the transmitter. The channel depth is a fixed distance from the ear canal following the contour of the ear canal at the exact location of the acoustic seal ring. The location of the channels is determined for each ear and selected in the area where the ear canal geometry movement due to the patient's temporomandibular joint action and change in head position is minimal.

In yet another embodiment, one or more compliant acoustic solid material ring seals are used; these comprise an elastomer of about 3 to 55 durometer (Shore A); and they position the hard hearing aid body at the center of the ear canal and along the acoustic axis of the ear canal. This results in improved acoustic response as distortion resulting from transmitter and receiver movement is minimized.

In yet another embodiment, one or more compliant acoustic solid material ring seals are used, comprising an elastomer of about 3 to 55 durometer (Shore A) that provides acoustic sealing near the transmitter and the other near the receiver and face plate. This prevents acoustic feedback. This is a direct result of removing any portion of the shell that would interfere with the ear canal that is geometrically altered by the patient's temporomandibular joint action and changes in head position.

In yet another embodiment, one or more compliant acoustic solid material ring seals are used, comprising an elastomer of about 3 to 55 durometer (Shore A); these seals provide stable positioning of the receiver and transmitter in the ear canal, thus minimizing distorted acoustic response due to mandibular motion.

In yet another embodiment, one or more compliant acoustic solid material ring seals, comprising an elastomer of about 3 to 55 durometer (Shore A) provide true acoustic sealing and allow more acoustic power directed at the tympanic membrane without acoustic feedback.

In another embodiment, one or more compliant acoustic solid material ring seals, comprising an elastomer of about 3 to 55 durometer (Shore A), allow positioning of the transmitter in the sensitive bony portion of the ear canal. This greatly improves the acoustic performance of the hearing aid instrument.

In another embodiment, one or more compliant acoustic solid material ring seals, comprising an elastomer of about 3 to 55 durometer Shore A, allow positioning the transmitter near the sensitive bony portion of the ear canal. In some cases it is not possible to position the hearing aid instrument in the bony portion of the patient's ear canal.

In another embodiment, one or more compliant acoustic solid material ring seals, comprising an elastomer of about 3 to 55 durometer (Shore A), each have a different Shore A durometer. The acoustic ring seal near the face plate and the receiver have either a higher or lower Shore A durometer than the acoustic ring seal near the transmitter deep in the canal. The system can thus be finely tuned to the patient's special requirements.

In another embodiment, one or more compliant acoustic solid material ring seals, comprising an elastomer of about 3 to 55 durometer (Shore A), are preferably easily replaced by the hearing professional. This is necessary for both clinical reasons and for the resulting wear that will occur. This is caused by the many insertions and removals of the instrument from the ear canal.

In another embodiment, one or more compliant acoustic solid material ring seals, comprising an elastomer of about 3 to 55 durometer (Shore A), are preferably securely held and positioned on the hearing aid body by two close tolerance annular channels and by the elastic tension of the elastomer ring seals when assembled on the annular channels.

In yet another embodiment, one or more compliant acoustic solid material ring seals, comprising an elastomer of about 3 to 55 durometer (Shore A), are made from one or more soft, compliant materials. By way of illustration, some suitable compliant materials include silicone polymer, polyurethane and polymeric retarded recovery foam.

In another embodiment, one or more compliant acoustic solid material ring seals, comprising an elastomer of about 3 to 55 durometer (Shore A), have one or more different cross-sectional shapes. One preferred cross section is a quad type of seal with four lobes. This provides twice the acoustic sealing surface of a comparable standard circular cross section.

In another embodiment, one or more compliant acoustic solid material ring seals, comprising an elastomer of about 3 to 55 durometer (Shore A), have different combinations of cross sectional shapes on the same hearing aid body. The system can thus be finely tuned to the patient's special requirements.

In another embodiment, one or more compliant acoustic solid material ring seals, comprising an elastomer of about 3 to 55 durometer (Shore A), provide acoustic seals near the transmitter and near the receiver and face plate. The result is reduced power required for the transmitter and improved battery life.

In another embodiment, one or more compliant acoustic solid material ring seals, comprising an elastomer of about 3 to 55 durometer (Shore A), provide controlled vibration isolation of the hearing aid positioned in the ear canal This lowers the natural frequency of the hearing aid positioned in the ear canal.

SUMMARY OF THE INVENTION

In accordance with one aspect of this invention, there is provided a hearing aid assembly comprising a hearing aid, wherein said hearing aid is comprised of an acoustic receiver, an acoustic transmitter, a body, a first annular channel, and a first annular ring with a cross-sectional T shape. In one preferred embodiment, (a) the acoustic receiver is operatively configured to fit into an external acoustic meatus of an ear, (b) the acoustic transmitter is operatively configured to fit into an inner ear canal of said ear, (c) the body is disposed between said acoustic receiver and said acoustic transmitter, said body being generally elliptical, (d) the first annular channel is disposed on a surface of said body such that said first annular channel circumscribes said body's circumference, (e) the first annular ring is disposed within said first annular channel, (f) the first annular channel has a first depth which is less than a depth of said first annular ring, such that said first annular ring protrudes from said first annular channel, (g) the quotient of a depth of said first annular channel divided by a thickness of said first annular ring is less than about 0.85, (h) the body further comprises a first cavity and a second cavity, each of which extends through a surface of said body, and (h) the first annular ring comprises a noncircular cross section with at least five sides.

BRIEF DESCRIPTION OF THE DRAWINGS

The invention will be described by reference to the following drawings, in which like numerals refer to like elements, and in which.

DESCRIPTION OF THE PREFERRED EMBODIMENTS

Figure 1:
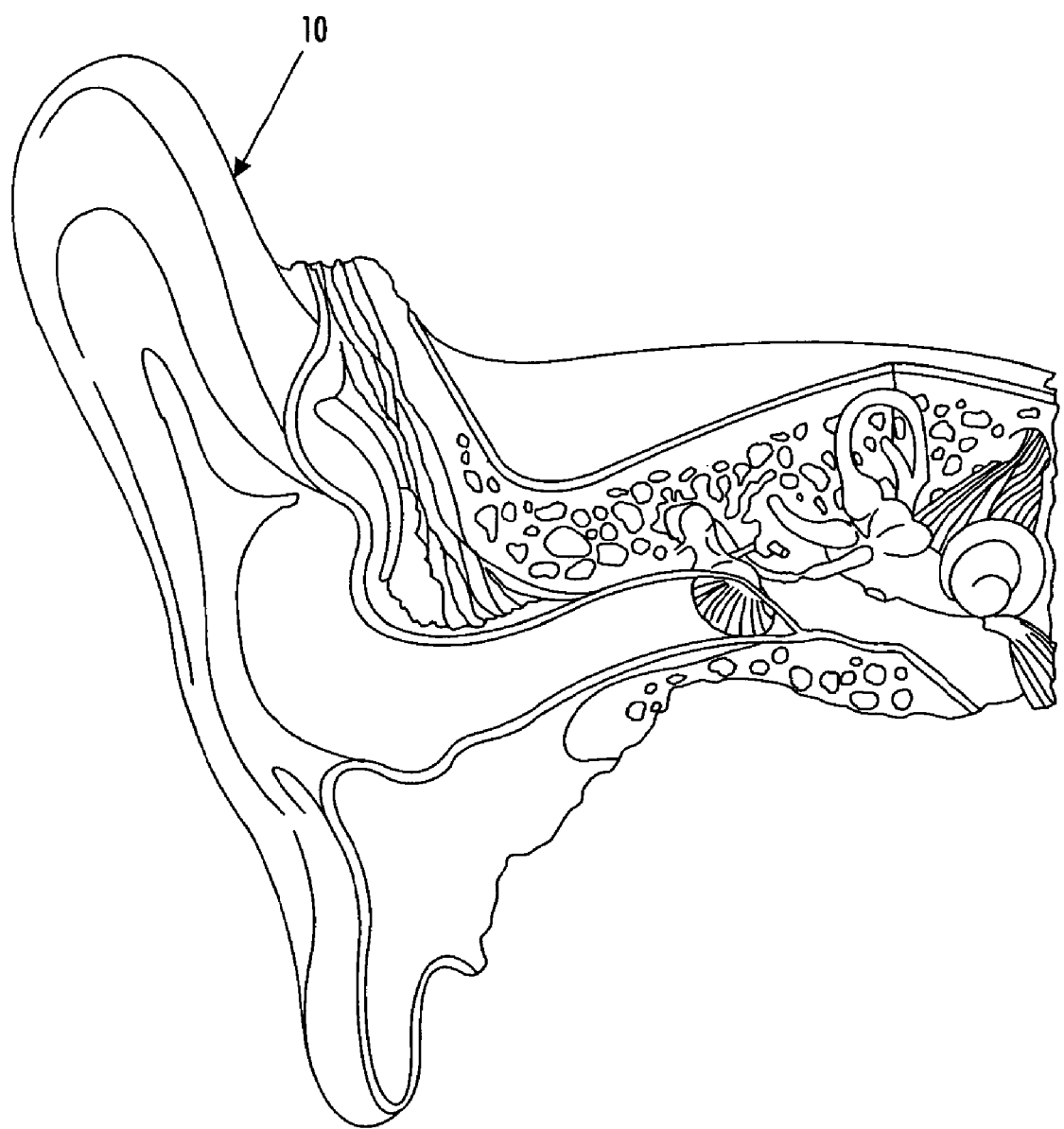
FIG. 1 is a sectional view of an ear.

FIG. 1 is a sectional view of an ear 10 of a human being. This sectional view of the ear 10 is taken from "The Anatomy Chart Series," Classic Library Edition, ISBN 0-9603730-4-7, Lb. Cat No. 86-071078, Page 21. In the embodiment depicted, the ear 10 is a right ear.

Reference also may be had, e.g. FIG. 1 of U.S. Pat. No. 6,228,020, which is ". . . a sectional elevational view of a user's hearing area to show the anatomy thereof." The entire disclosure of such United States patent is hereby incorporated by reference into this specification.

Figure 2:
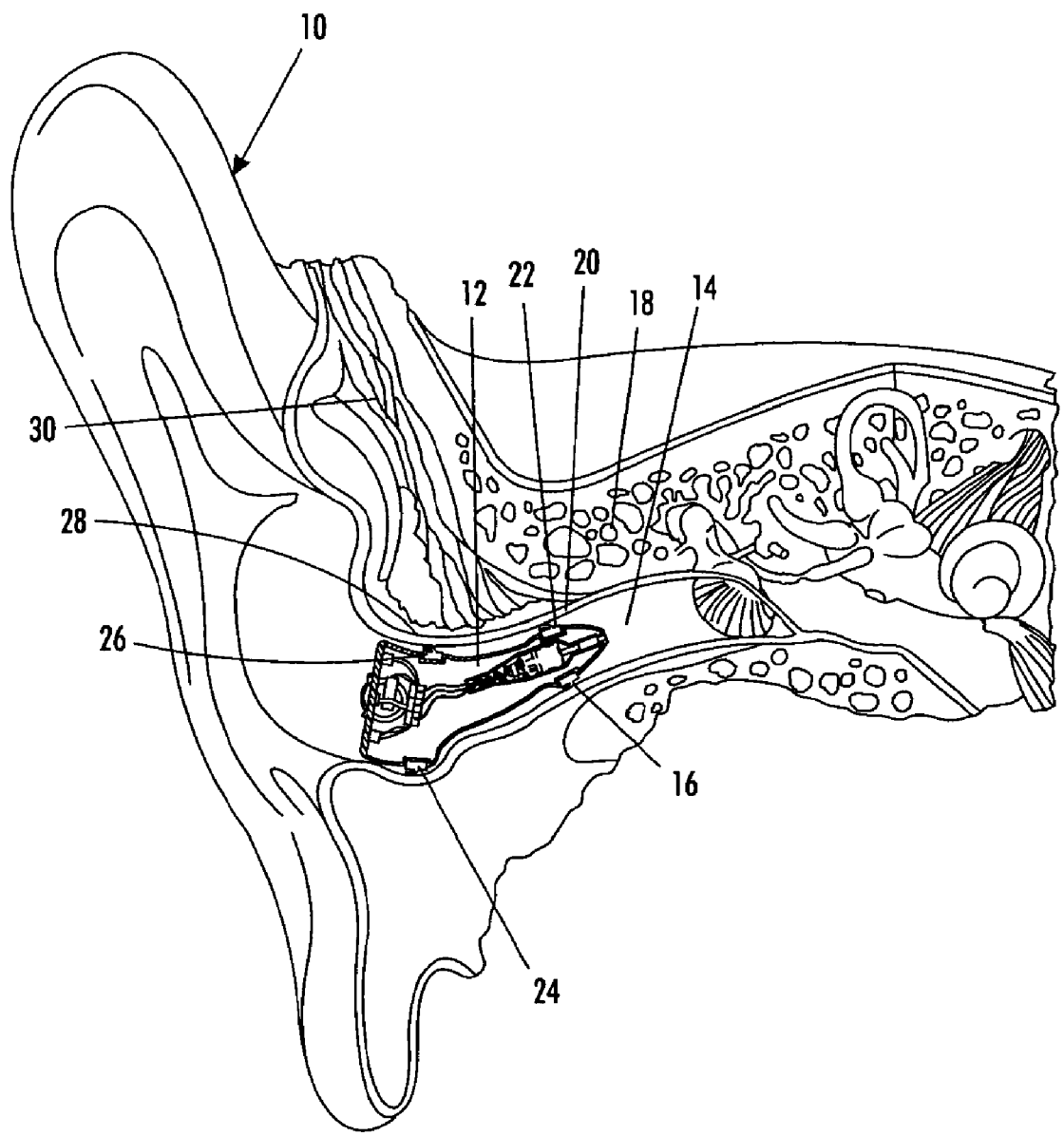
FIG. 2 is a sectional view of the ear of FIG. 1 showing one hearing aid of the present invention.

FIG. 2 is a sectional view of the ear 10 with a hearing aid assembly 12 disposed within the ear canal channel 14. The hearing aid assembly 12 is comprised of a first seal 16 that is disposed just prior to the bony portion 18 of the ear. In the embodiment depicted, the bony portion 18 starts at point 20. The distance between the end 22 of the first seal 16 and the point 20 is preferably no greater than about 2 millimeters and, more preferably, is from about 0.5 to about 2 millimeters. This distance will vary with each patient's unique anatomy. In one preferred embodiment, such first seal 16 has a cross-sectional shape in the form of a T.

In this specification, reference will be made to both "seal 16" and "ring 16," and also to both "seal 24" and "ring 24." As will be apparent to those skilled in the art, the elements 16 and 24 are seals that, in one embodiment, may be ring shaped; and the term "seal" and "ring," as used with respect to these elements, denotes the same thing.

Referring again to FIG. 2, and in the preferred embodiment depicted therein, it will be seen that the hearing aid assembly is comprised of a second seal 24 that is comprised of a front surface 26. The surface 26 is located prior to the beginning point 28 of the Temporalis muscle 30. In one aspect of this embodiment, the surface 26 is no more than about 2 millimeters from point 28 and, more preferably, is from about 1 to about 2 millimeters from about point 28. Again, this precise distance will vary with the unique anatomy of each individual patient. In one embodiment, such second seal 24 has a cross-sectional shape in the form of a T.

Figure 3:
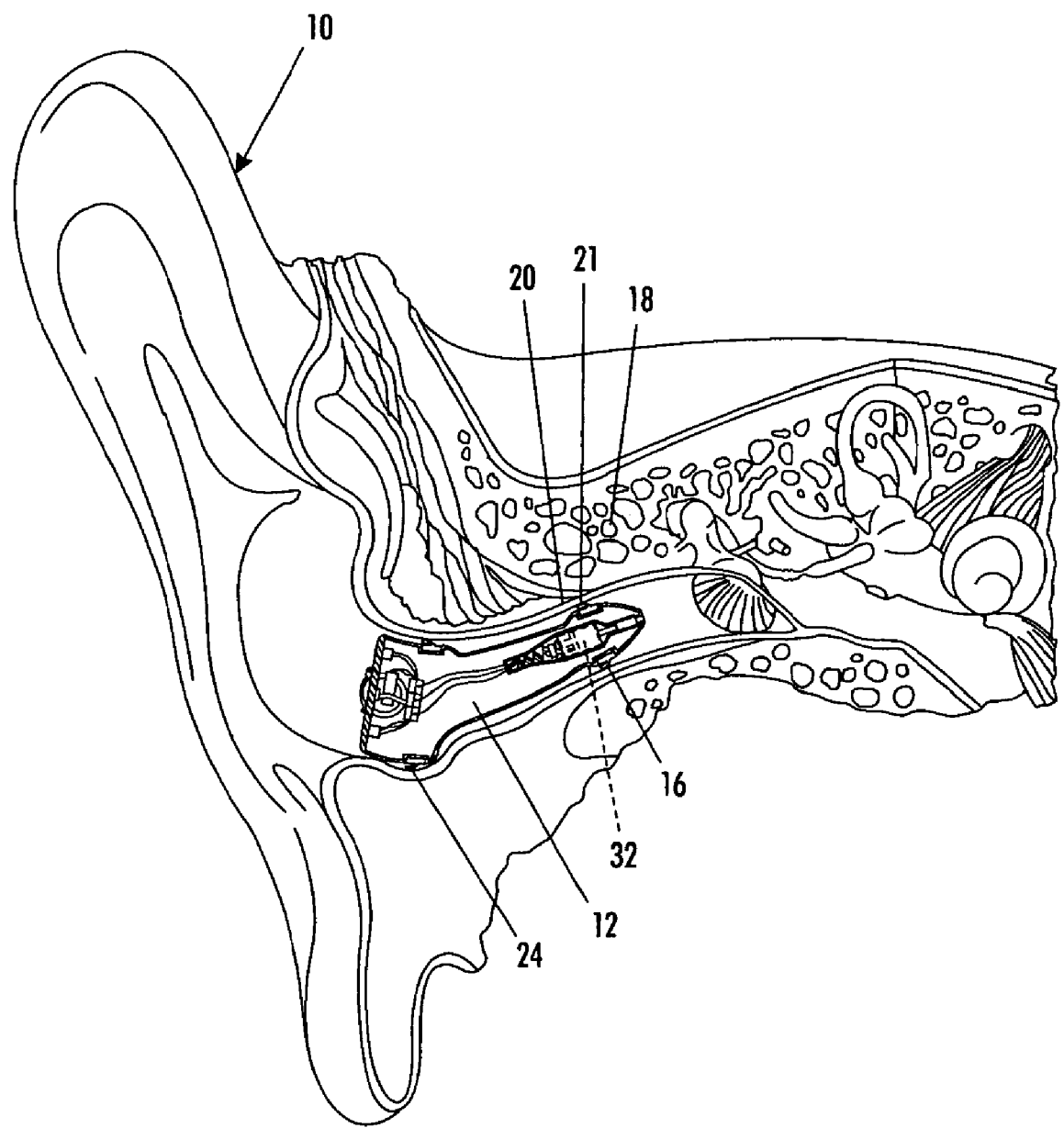
FIG. 3 is a sectional view of the ear of FIG. 1 showing a different hearing aid of the present invention.

FIG. 3 depicts the assembly 12 located in the ear 10. FIG. 3 differs from FIG. 2 in that the seal 16 is located past (and not prior to) the beginning point 20 of bony section 18. In the embodiment, the front face 21 of the seal 16 is at least about 1 millimeter past the point 20 at which the bony section 18 of ear 10 begins. The precise distance by which the assembly 12 protrudes into the bony section will vary with the anatomy of the patient.

Referring again to FIG. 3, and in the embodiment depicted, it will be seen that hearing aid assembly 12 is comprised of a transmitter 32. As is known to those skilled in the art, hearing aid transmitter assemblies are often comprised of amplifiers, speakers, signal processing circuitry, and other electronic components. Reference may be had, e.g., to U.S. Pat. No. 5,048,090 (hearing aid with transmitter and microphone housing parts), U.S. Pat. No. 5,835,610 (hearing aid system), U.S. Pat. Nos. 4,061,972, 6,229,900 (hearing aid including a programmable processor), U.S. Pat. No. 5,338,287 (electromagnetic induction hearing aid device), U.S. Pat. No. 5,447,489 (bone conduction hearing aid device), U.S. Pat. No. 5,202,927 (remote controllable, programmable hearing aid system), U.S. Pat. No. 4,947,432 (programmable hearing aid), and the like. The entire disclosure of each of these United States patents is hereby incorporated by reference into this specification.

Figure 4:
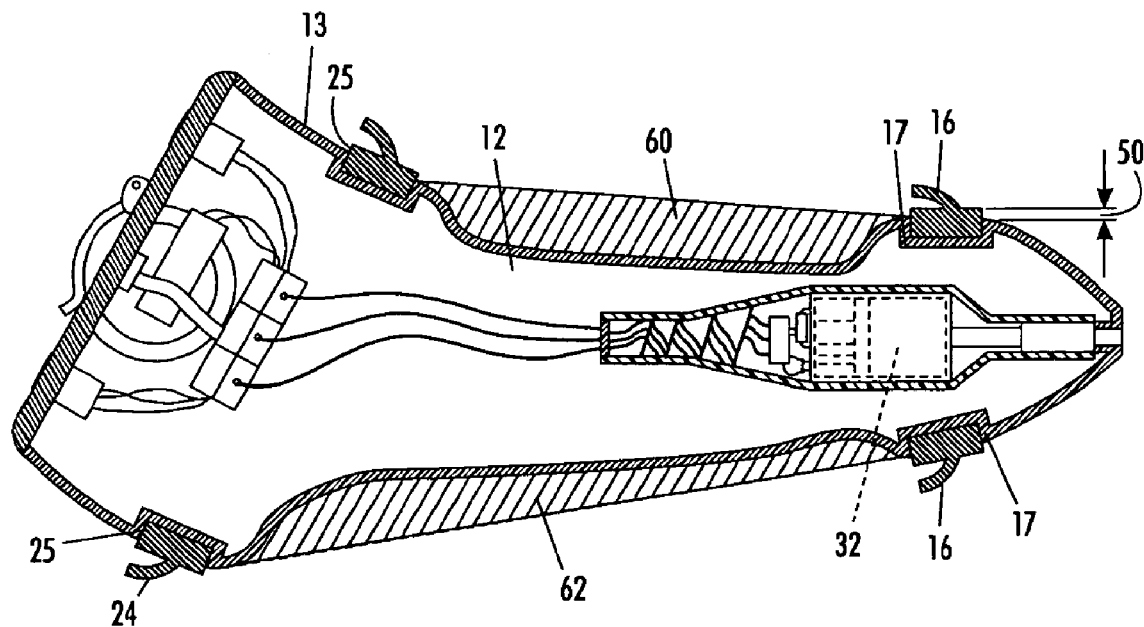
FIG. 4 is a schematic view of one hearing aid of the present invention.

FIG. 4 is a sectional view of one preferred hearing aid assembly 12 comprised of annular rings 16 and 24. Referring to the embodiment depicted, the annular rings 16 and 24 are preferably comprised of an elastomeric material with certain properties.

The annular rings 16/24 preferably have a hardness, as measured by Shore A Durometer readings, of from about 8 to about 85. In one embodiment, the Shore A hardness is from about 10 to 15 and, more preferably, 12 to 14.

Elastomeric materials with these hardness ratings are well known. Thus, silicone rubber often has a hardness of from about 10 to about 60. By way of illustration, one suitable material is, e.g., DYNA FLEX TPE, a thermoplastic elastomeric material with a shore hardness of about 13 that is sold as product number G67713.

These and similar elastomeric materials are commercially available. Thus, by way of illustration and not limitation, one may use one or more of the medical grade elastomeric materials available from the Nusil Technology Company of 1050 Cindy Lane, Carpniteria, Calif.

In one embodiment, it is preferred that the annular rings 16/24 have a tensile strength of form about at least about 400 pounds per square inch. In one embodiment, the tensile strength of the annular rings 16/24 is at least about 450 pounds per square inch and may range from about 450 to about 2,000 pounds per square inch. In one embodiment, the tensile strength is from about 500 to about 700 pounds per square inch. In another embodiment, the tensile strength is from about 600 to about 1,750 pounds per square inch.

The elongation of the annular rings 16/24 preferably ranges from about 40 to 125 percent, and, in one embodiment, is from about 50 to 90 percent.

In one embodiment, the annular rings 16 and 24 comprise or consist essentially of a thermoplastic polyurethane elastomer such as, e.g., "PELLETHANE 2363-80A," sold by the Dow Plastics Group of the Dow Chemical Company. Polyurethane elastomers are preferred in that they have good blood and tissue compatibility.

In one embodiment, the annular rings 16/24 are comprised of the polymeric material disclosed in U.S. Pat. No. 5,002,151, the entire disclosure of which is hereby incorporated by reference into this specification.

In one embodiment, the hardness of the annular ring 16 is lower than the hardness of the annular ring 24. In one aspect of this embodiment, the ratio of the hardness of the annular ring 16 to the hardness of the annular ring 24 is less than about 0.9 and, preferably, less than about 0.7. In one embodiment, such ratio is less than about 0.6. It is preferred, however, that the annular rings 16/24 each have a hardness that is at least about 8 Shore A hardness Referring again to FIG. 4, and to the preferred embodiment depicted therein, it will be seen that annular rings 16/24 are each disposed within grooves 17/25. These grooves 17/25 preferably have a depth 50 that is less than the thickness of the annular rings 16/24. This is best illustrated with reference to FIG. 8A.

Figure 8A:
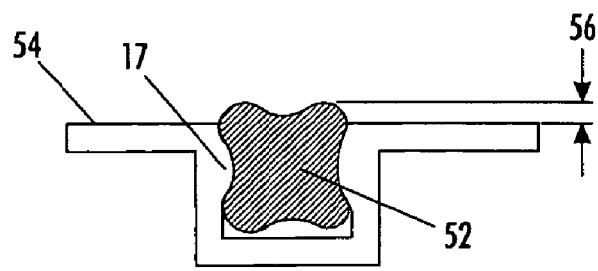
FIGS. 8A, 8B, and 8C are sectional views of some preferred seal assemblies of the present invention.

Referring to FIG. 8A, and in the preferred embodiment depicted therein, it will be seen that annular groove 17 has disposed within it annular ring 52 that extends beyond the top 54 of the annular groove 17 by a distance 56 so that the annular ring 52 may engage in a compression fit with the ear canal of a patient. Thus, the height 58 of the annular groove 17 (see FIG. 8C) divided by the height 60 of the annular ring 16 is preferably less than about 0.85 and, even more preferably, less than 0.8. In one embodiment, such ratio is less than about 0.75.

Referring again to FIGS. 8A, 8B, and 8C, it is preferred that the annular rings 16/24 have cross-sectional shapes such that, in the absence of any compression, they are removably and lockably engaged within their corresponding annular grooves 17 and 25.

Figure 8B:
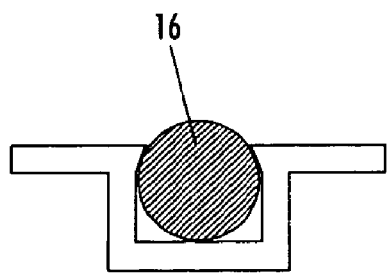
Figure 8C:
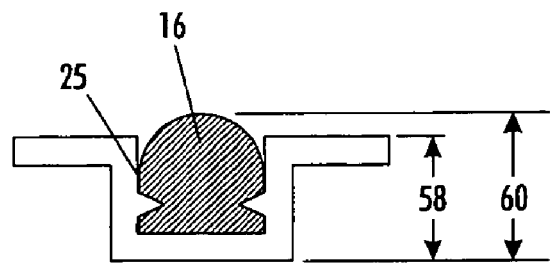

One means of obtaining this removable locking engagement is shown in FIGS. 8A, 8B, and 8C. Thus, in the embodiments depicted, in FIG. 8A, the four lobed quad is one preferred cross section of the compliant acoustic solid ring seals. It provides twice the sealing surface of the comparable o-ring and because of this double sealing action less pressure is required to maintain an effective acoustic seal. The seal is held firmly in the channel by the additional material in the channel that conforms the four lobed quad.

In FIG. 8B, the o-ring cross section of the compliant acoustic solid ring seals is shown. The seal is held firmly in the channel by the additional material in the channel near the outer surface of the hearing aid body.

In FIG. 8C, the mushroom type cross section of the compliant acoustic solid ring seals is shown. The seal is held firmly in the channel by the additional material in the channel near the base of channel.

What each of the embodiments of FIGS. 8A, 8B, and 8C have in common is that the annular ring used has a cross-sectional shape that contains more than 5 sides. As will be apparent, the circular cross-sectional shape has an infinite number of sides, and the other cross-sectional shapes have more sides than is conventionally found with a rectilinear cross-sectional shape.

As is known to those skilled in the art, annular rings with shapes similar to those depicted in FIGS. 8A, 8B, and 8C are commercially available. Thus, by way of illustration, Minnesota Rubber pioneered the design and production of four-lobed seals with the "QUAD RING" design.

Referring again to FIGS. 8A, 8B, and 8C, in addition to having cross-sectional shapes of the annular rings 16/24 that contribute to them being lockably engaged within the grooves 17/25, the grooves 17/25 also may have cross-sectional shapes that contribute to such locking engagement. Thus, and referring to FIG. 8A, it will be seen that groove 17, especially in its upstanding walls, has a cross-sectional shape that engages the indented portions of the acoustic seal.

Referring again to FIG. 4, and to the preferred embodiment depicted therein, it will be seen that hearing aid assembly 12 is comprised of a body 13 that, in the area between annular seals 16 and 24, is recessed with somewhat concave shape. Consequently, and referring to FIG. 3, when the hearing aid assembly is disposed within a patient's ear canal, the area of the body 13 between the annular seals 16 and 24 will not be contiguous with the Temporalis muscle. As is known, the Temporalis muscle moves when a patient opens his mouth, moves his jaw, and/or moves his head; and it is preferred that such movement not cause contact between such muscle and the body 13 of the hearing aid assembly.

Referring again to FIG. 4, and in the embodiment depicted, the shaded areas 60 and 62 represent the recesses required for a particular patient to avoid contact of his Temporalis muscle with the body 13.

Figure 5:
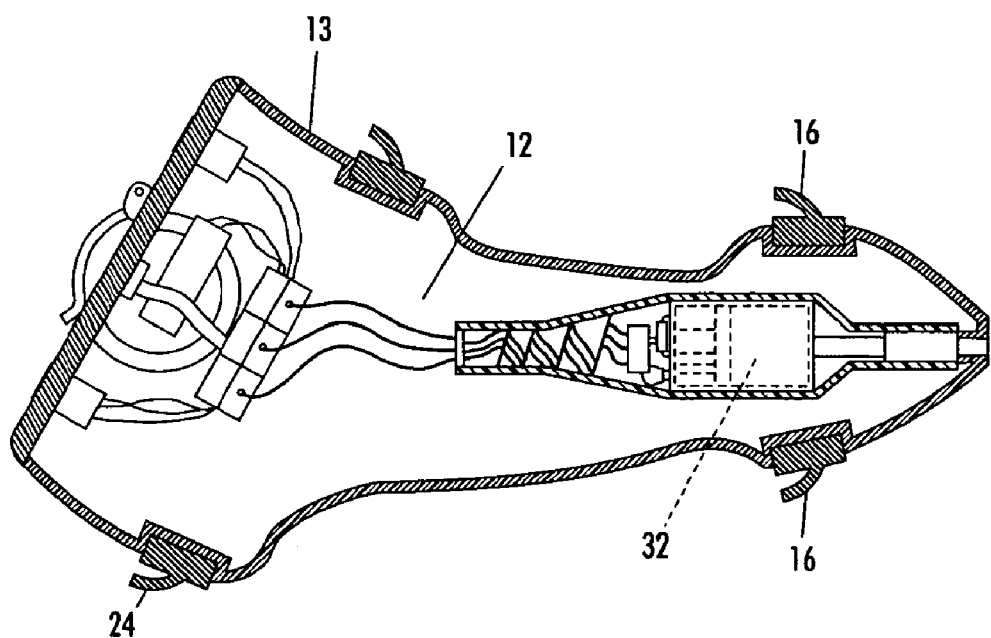
FIG. 5 is a schematic view of another hearing aid of the present invention.

FIG. 5 illustrates a configuration of a hearing aid assembly 12 that may be used in the manner depicted in FIG. 2, wherein the annular seal ring 16 is disposed in front of bony portion 18, which starts at point 20. By comparison, FIG. 5 illustrates a hearing aid assembly 12 that may be used in the manner depicted in FIG. 3, wherein the annular ring 16 is disposed behind the point 20. As will be apparent, the distances between the annular rings 16 and 24 vary in the embodiments of FIGS. 4 and 5.

Figure 6:
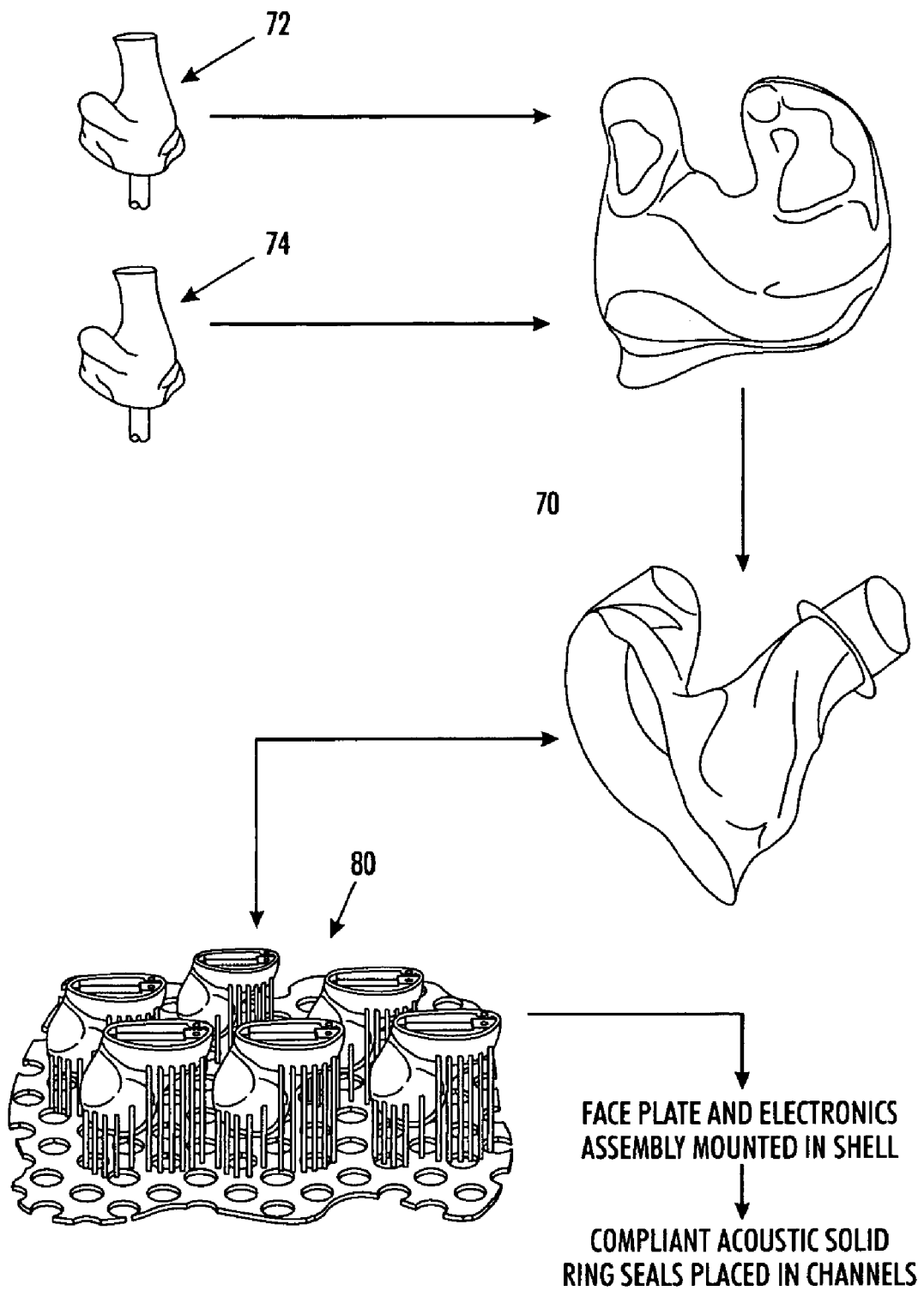
FIG. 6 is a schematic diagram of a computer aided manufacturing process for use in the production of one embodiment of the present invention.

FIG. 6 is a schematic diagram of a preferred computer aided manufacturing process 70 required to economically produce the preferred hearing aid 12. Two ear impressions (72/74) of the patient are taken but not limited to just two, since unusual clinical situations may require additional ear impressions. The first ear impression 72 is a standard type, while the second 74 is taken of the ear canal when the geometry is modified by temporomandibular joint action and changes in head position. The ear impressions are scanned using the three dimensional scanner A three dimensional virtual image is created with computer aided design of each ear impression. The images are compared and examined for areas where material should be removed or added resulting from temporomandibular joint action and changes in head position. Material is removed in the critical area between the two compliant acoustic solid material ring seals such that the hearing aid is positioned and held in alignment by the two acoustic ring seals 16/24. No hearing aid acrylic shell body material is in contact with the ear canal between the two compliant acoustic solid material ring seals 16/24. The acoustic ring seal seating channel depth is preferably maintained at a constant distance from the patient's ear canal. This insures a uniform peripheral contact pressure of the compliant acoustic solid material ring seals with the ear canal. The completed shell date is then imported to the 3D printing equipment. 80. The printers use stereo lithography that preferably uses a laser to solidify thin layers of a hypoallergenic UV cured acrylic liquid polymer. The shell is manufactured by the 3D printer. The face plate and electronics assembly are mounted in the shell. Compliant acoustic solid ring seals are mounted into the seal channels.

The process illustrated in FIG. 6 may be performed, e.g., by well known prior art means. Thus, for example, one may use the techniques described in published United States patent application US 2002/0138237, the entire disclosure of which is hereby incorporated by reference into this specification. Relevant portions of this published patent application are presented below.

"Various methods of determining or acquiring the shape of a body, such as an ear impression, are well-known in the art. Determination of position of a point on a surface of an object may be performed by moving a mechanical device into contact with the point and reading the position of the mechanical device, e.g. using a co-ordinate measuring machine having scales on moving parts."

"In non-contact measurements, positions of points on the surface of an object may be determined by transmitting one or more beams of radiated energy towards the object and detecting radiated energy that has interacted with arbitrary parts of the object."

"The shape of an object may also be determined with a plurality of electronic cameras. The object is then illuminated by a set of incoherent light sources, such as light bulbs, emitting substantially white light in all directions. A plurality of cameras with known positions in relation to each other are used to determine positions of points of the surfaces of the object by triangulation methods."

"When the shape of the auditory canal is acquired by scanning of the canal itself, dynamic recording of the auditory canal may be performed. Since the shape of the auditory canal changes as a result of speaking, eating, drinking etc, this method of acquiring the shape of the auditory canal provides data which vary in time whereby such shape changes can also be taken into consideration during manufacture of the corresponding hearing aid housing."

"Alternatively, a plurality of impressions may be made of the auditory canal with the jaw in various respective positions in order to accommodate shape changes of the auditory canal. For example, two impressions may be made namely one with closed mouth and one with open mouth."

"Having acquired digital data representing the shape of the auditory canal and a part of the outer ear, these data may be further manipulated according to well-known methods of CAD/CAM systems to design and produce a hearing aid housing, e.g. including forming a three-dimensional model of the shape of the hearing aid shell. Further, the model may be displayed on a computer screen in various three-dimensional views and two-dimensional cross-sections, and various automatic and operator controlled functions, including the functions described herein, for adjustment of the model may be provided by a CAD/CAM system."

"Thus, according to the present invention, a CAD/CAM system is provided for design and manufacture of a hearing aid housing with a face plate and a shell that is matched to the auditory canal of a user, comprising a processor that is adapted to receive and process data representing the shape of the auditory canal, forming a three-dimensional model of the shell based on the data, and outputting data representing the model for production of the shell and the face plate based on the model."

"Two identical models may be formed from the acquired digital data, i.e. a model of the auditory canal including a part of the outer ear, and a model of the hearing aid shell. The model of the auditory canal remains unchanged while the model of the hearing aid shell may be subject to modifications and additions of various features as will be described below. The models may be displayed in distinguishable colors, and the shell may be displayed inserted in the auditory canal. For this and other purposes, the model of the auditory canal may be displayed transparently."

"Upon formation of the three-dimensional model of the hearing aid shell, a contour encircling the shell may be selected for definition of a junction between the hearing aid shell and the face plate, and data representing the selected junction contour may be determined. Preferably, the junction contour is a plane contour."

"According to the invention, the shell is produced based on the model and may be terminated with an outward opening defined by the junction contour. In one embodiment of the invention the junction contour data are transferred to a numerically controlled machine that automatically cuts a separately manufactured face plate along a contour that matches the junction contour. As mentioned above, the junction contour may be a plane contour compatible with a plane face plate."

"According to a preferred embodiment of the invention, a three-dimensional model of the face plate is formed that matches the selected junction contour, and the face plate model and the shell model are combined into one three-dimensional model of the hearing aid housing. Based on the combined model, a hearing aid housing with an integrated face plate is produced, e.g. utilizing a rapid prototyping technique, such as stereolithography, laser sintering, fused deposition modeling, drop deposition printing (resembles ink jet printing), etc."

"Displaying the model of the hearing aid housing inserted in the auditory canal model may facilitate selection of a position of the acoustic output opening so that the output opening emits sound in the direction of a longitudinal axis of the auditory canal thus, minimizing the risk of the output opening emitting sound towards a wall of the auditory canal or even being partially or entirely occluded by an auditory canal wall."

"The outer dimensions of the hearing aid shell model may be selectively increased so that the corresponding hearing aid shell exerts a pressure on the auditory canal tissue when the shell is inserted in the auditory canal. The outer dimensions may be uniformly increased over the entire surface of the shell, or the size increase may be reduced gradually along a longitudinal axis of the shell so that very little or no pressure is exerted on tissue residing deeply in the auditory canal. Alternatively or additionally, the outer dimensions may be increased at selected areas of the shell surface, e.g. forming a rib partly or fully encircling the hearing aid shell, the rib providing a tight seal against the auditory canal wall when the shell is inserted in the auditory canal."

"Further, a tightening contour may be selected that extends along the surface of the shell and partly or fully encircles the shell. A groove extending along the contour may be included in the model having a cross-section with a shape and dimensions that match a desired tightening ring to be mounted in the produced shell, or alternatively, that is adapted for automatic deposition of a material different from the material of the shell, the deposited material constituting a tightening protrusion. The tightening protrusion or the tightening ring provides an appropriate and secure tightening of the shell to the auditory canal when the shell is mounted in the auditory canal. If the hearing aid does not provide a good seal when inserted in the auditory canal, feedback generating oscillations usually occurs and the gain has to be decreased and thus, the full capabilities of the hearing aid can not be utilized. Further, the shape of the auditory canal typically changes in response to user activity, such as chewing, yawning, etc. A rigid hearing aid shell may not be capable of adjusting to changes in auditory canal shape due to movements of the jaw and thus, a shell that is perfectly fitted initially may produce unsatisfactory results in normal use. A flexible tightening ring solves this problem."

"In an embodiment wherein the shape of the auditory canal has been determined dynamically, the tightening contour is preferably selected at positions corresponding to positions in the auditory canal at which the above-mentioned dynamic variations of the dimensions of the auditory canal exhibit small variations whereby a secure and tight mounting of the shell in the auditory canal is provided independent of user activity."

"Three-dimensional models of shapes and geometries of various hearing aid components, such as microphones, signal processors, output transducers, etc, may be stored in a database, and may be selected for incorporation into the hearing aid. Utilizing well-known CAD/CAM methods, models of the selected components may be positioned and displayed within the hearing aid housing model and may be moved around for selection of respective optimum positions and orientations, e.g. for provision of a hearing aid of a minimum size. Collision checks may be performed, and positions of the features of the hearing aid shell, e.g. the vent channel, may also be moved around to further optimize positioning of the hearing aid components."

"Although there may be sufficient room for a specific component at a certain position within the shell, it may not be possible to move the component into that position, e.g. because the internal volume of the shell forms a bottle neck at the input opening. Thus, during design of the hearing aid, collision check may also be performed during movement of the component in question through the input opening into the shell along a desired path towards the desired mounting position."

"The shape of the shell may be adjusted selectively in order to increase the internal volume of the shell for provision of sufficient space for a specific component. Preferably, the outer volume of the shell is increased at areas corresponding to ear locations that are relatively non-sensitive to pressure."

"The selection of the path of the junction contour may be performed while the shell model is displayed as inserted in the auditory canal. In this way, the position of the face plate covering the shell outward opening may be selected for optimum cosmetic appearance when the hearing aid is inserted in the auditory canal. It should be noted that a model of a part of the outer ear should be included in the model of auditory canal facilitating evaluation of the cosmetic appearance of the hearing aid. Typically, an impression of an auditory canal also contains an impression of a part of the outer ear."

"The surface of the shell model may be smoothed to eliminate sharp edges and corners and to obtain a smooth surface. The entire shell may be smoothed or specific areas of the shell may be selected, e.g. using a computer mouse with a cursor, for smoothing by well known CAD/CAM smoothing techniques."

"For example, presence of cerumen or fall off tissue in the auditory canal when the impression of the auditory canal is made may create undesired artifacts in the shell model. An artifact may be removed from the hearing aid housing model by deleting the surface covered by the artifact from the model and calculating a new surface substituting the deleted surface based on the model surface surrounding the artifact."

"Further, a serial number or another identification of the produced hearing aid housing may be incorporated into the housing model, e.g. in a selected position, so that the housing may be produced with an inherent identification."

"The finished hearing aid housing model may be stored in a database for later retrieval. The database may be utilized for further automation of the design process. For example, the acquired data representing the shape of an auditory canal may be compared to the shape of housing models stored in the data base, and the best match may be retrieved and the positions of features of the hearing aid housing and selections, positions, and orientations of hearing aid components may automatically be reused in the hearing aid housing to be designed. An operator may subsequently adjust or change the retrieved positions, orientations and selections. The comparison may be performed solely for selected corresponding areas of the hearing aid housings. The models may be stored in the database in a reduced form requiring a reduced amount of data, since the very high mechanical tolerances required for production of hearing aid housings are not required for comparisons of shape with the purpose of reusing positions, orientations, selections, features, or components relating to the stored hearing aid housing models."

"A patient database may be formed comprising records with a patient identifier, e.g. name and number, holding the hearing aid housing model of the patient in question. The records may further hold respective models of the original impression of the auditory canal of the patient, and identifiers and models of the hearing aid components used in the patient's hearing aid, etc. A new hearing aid for a specific user may then be produced without having to acquire the shape of the auditory canal again, e.g. by making a new impression of the auditory canal, since the previously acquired shapes may be easily retrieved from the patient database."

"It is well-known in the art to produce a housing based on a three-dimensional computer model of the housing utilizing so-called rapid prototyping techniques, such as stereolithography, laser sintering, fused deposition modeling, drop deposition printing, etc. For example, in stereolithography, the computer model is converted into a number of cross-sections that may be equidistant, plane-parallel and horizontal, but need not be. Then, the housing is manufactured by producing the individual cross-sectional planes successively and on top of each other, underneath each other or next to each other and joining them together. A container with activated liquid synthetic resin may be located on a computer controlled movable platform. By targeted use of radiation directed at the surface of the liquid synthetic resin and causing at least part-polymerization of the synthetic resin, it is possible to generate a first cross-section of the hearing aid housing. After completion of each cross-section, the platform is lowered by the layer thickness so that the next cross-sectional plane on the surface of the liquid synthetic resin can be produced in the same way. This continues until the polymerized housing can be removed from the container."

"Laser sintering is another layered fabrication process producing a three-dimensional object from powdered materials in a layered fashion utilizing heat generated by a $CO_2$ laser. As in stereolithography, the computer model is converted into a number of cross-sections successively produced by applying the laser beam to a thin layer of powder. The laser beam fuses the powder particles to form a thin layer of solid mass. The laser sintering process allows for the use of a variety of powdered materials."

"A further possibility is to produce the cross-sections with a printing method similar to that used in an ink-jet printer, i.e. a drop deposition printing, for example, by consecutively producing successive cross-sections using the drop depositioning printing and, after at least partial polymerization which should already take place at the printing operation, by then stacking them on top of each other and joining them to form a shell."

"It is an important advantage of the present invention that a hearing aid housing that is matched to a specific auditory canal and that includes various features, e.g. an integrated face plate, a ventilation channel, a tightening protrusion, a battery opening with engaging means, an ear wax guard holder, etc, can be produced automatically with a minimum of manual operations."

"Preferably, the shell is produced from a flexible, sweat resistant material. The material should not cause allergic reactions. The shells are preferably polished in a polishing cylinder. The material may be colorless or may be of a color that is close to a desired color. Then, the shell may be colored in a coloring substance of a desired color, e.g. by dipping the shell in the coloring substance."

Figure 7:
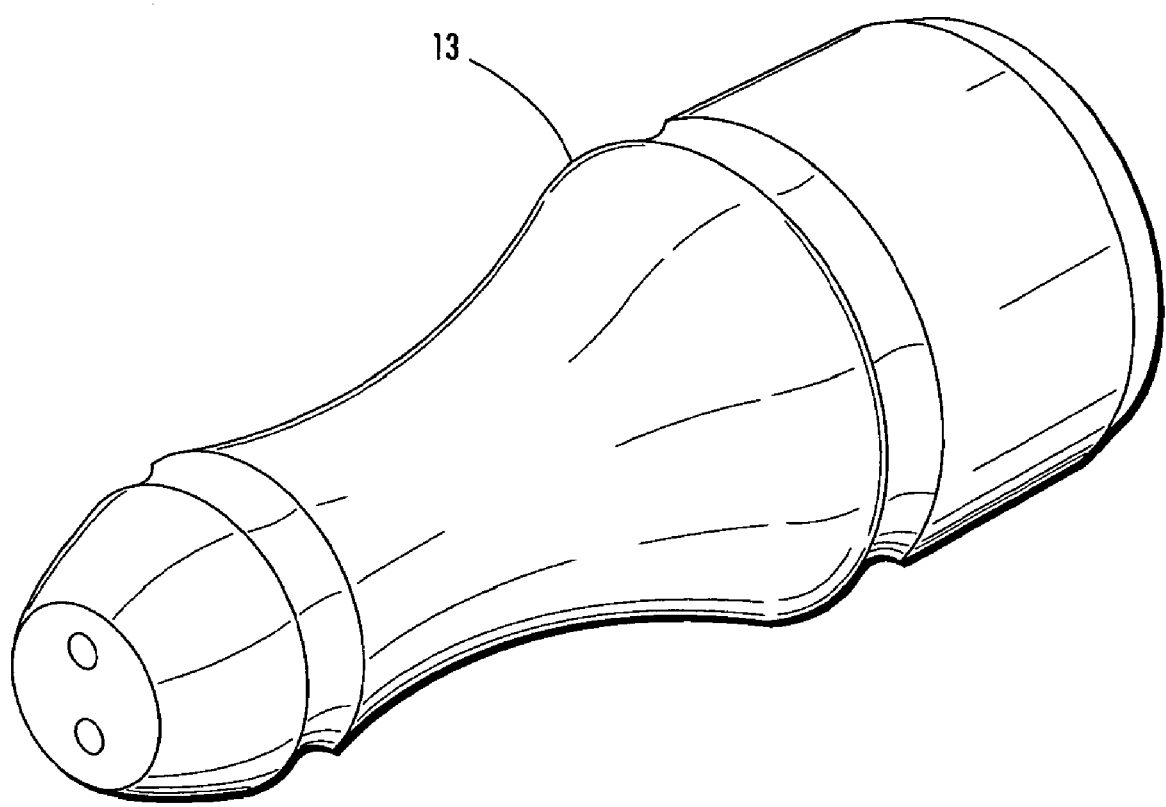
FIG. 7 is an isometric view of one preferred embodiment of the invention.

FIG. 7 is an isometric view of one preferred embodiment of the invention.

Figure 9A:
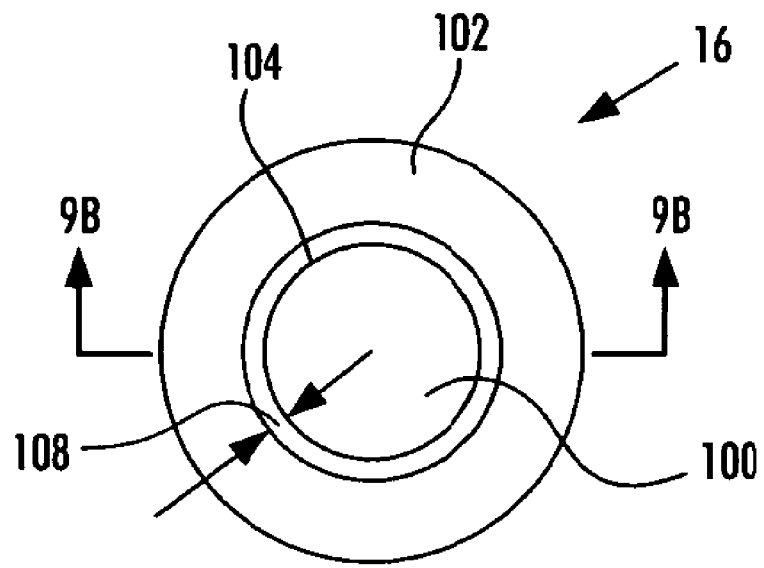
FIG. 9A is top view of another embodiment.
Figure 9B:
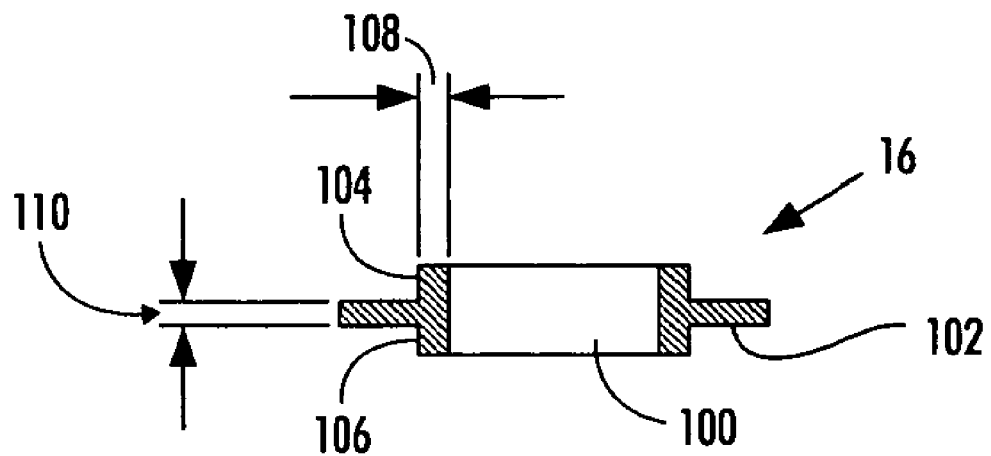
FIG. 9B is a sectional view of another embodiment.

FIG. 9A is a top view of one preferred seal 16 of the invention, and FIG. 9B is a sectional view of seal of FIG. 9A, taken along lines 9B-9B. Referring to FIGS. 9A and 9B, it will be seen that seal 16 is comprised of an orifice 100 and, disposed around such orifice 100, a base 102 and upstanding sections 104 and 106. As will be apparent, section 106 cannot readily be seen in FIG. 9A but is depicted in FIG. 9B.

In the preferred embodiment depicted in FIGS. 9A and 9B, it is preferred that upstanding sections 104 and 106 each have a wall thickness 108 of at least about 0.039 inches.

In the preferred embodiment depicted in FIGS. 9A and 9B, it is also preferred that the base 102 have a wall thickness 110 of at least about 0.031 inches, provided that the wall thickness 108 divided by the wall thickness 110 is at least 1.1 and, more preferably, at least about 1.26.

In the preferred embodiment depicted in FIGS. 9A and 9B, it is preferred that the seal 16 have a Shore A hardness of from about 12 to about 14 and that it has an elongation of from about 40 to 80 percent.

We claim:

1. A hearing aid assembly comprising a hearing aid wherein said hearing aid is comprised of an acoustic receiver, an acoustic transmitter, a body, a first annular channel, a first annular ring with a cross-sectional T shape, wherein:
    (a) said acoustic receiver is operatively configured to fit into an external acoustic meatus of an ear,
    (b) said acoustic transmitter is operatively configured to fit into an inner ear canal of said ear,
    (c) said body is disposed between said acoustic receiver and said acoustic transmitter, said body being generally elliptical, (d) said first annular channel is disposed on a surface of said body such that said first annular channel circumscribes said body's circumference,
(e) said first annular ring is disposed within said first annular channel,
(f) said first annular channel has a first death which is less than a depth of said first annular ring, such that said first annular ring protrudes from said first annular channel,
(g) the quotient of a depth of said first annular channel divided by a thickness of said first annular ring is less than about 0.85,
(h) said body further comprises first cavity and a second cavity, each of which extends through a surface of said body,
(i) said first annular ring comprises a noncircular cross section with at least five sides, and
(j) said annular ring has a Shore A hardness of from about 12 to about 14.

2. The hearing aid assembly as recited in claim 1, wherein said annular ring has an elongation of from about 50 to about 90 percent.

3. The hearing aid assembly as recited in claim 2, wherein said body is further comprised of a second annular channel wherein said channel circumscribes said body.

4. The hearing aid assembly as recited in claim 3, wherein said first annular ring has a four lobed quad cross section.

5. A hearing aid assembly comprising a hearing aid wherein said hearing aid is comprised of an acoustic receiver, an acoustic transmitter, a body, a first annular channel, and a first annular ring with a cross-sectional T shape, wherein:
(a) said acoustic receiver is operatively configured to fit into an external acoustic meatus of an ear,
(b) said acoustic transmitter is operatively configured to fit into an inner ear canal of said ear,
(c) said body is disposed between said acoustic receiver and said acoustic transmitter, said body being generally elliptical,
(d) said first annular channel is disposed on a surface of said body such that said first annular channel circumscribes said body's circumference,
(e) said first annular ring is disposed within said first annular channel,
(f) said first annular channel has a first depth which is less than a depth of said first annular ring, such that said first annular ring protrudes from said first annular channel,
(g) the quotient of a depth of said first annular channel divided by a thickness of said first annular ring is less than about 0.85,
(h) said first annular ring comprises a first cross section wherein said first cross section comprises a noncircular cross section with at least five sides,
(i) said first annular channel comprises an annular channel cross section, first annular ring comprises a first indented portion, wherein said annular channel cross section comprises a shape that engages said first indented portion of said first annular ring, and
(j) said first annular ring has a Shore A hardness of from about 12 to about 14.

6. The hearing aid assembly as recited in claim 5, wherein said first annular ring has an elongation of from about 50 to about 90 percent.

* * * * *